United States Patent [19]
Finck

[11] Patent Number: 6,019,384
[45] Date of Patent: Feb. 1, 2000

[54] LEAF SPRING SUSPENSION SYSTEM

[75] Inventor: Darren Gregory Finck, Jacksonville, Fla.

[73] Assignee: The B. F. Goodrich Company, Charlotte, N.C.

[21] Appl. No.: 09/094,801

[22] Filed: Jun. 15, 1998

[51] Int. Cl.[7] .................................................. B60G 11/38
[52] U.S. Cl. .................... 280/124.17; 280/686; 267/260; 267/269
[58] Field of Search .............................. 280/17, 175, 680, 280/686, 124.17, 124.175, 124.166, 124.165; 267/260, 261, 269, 270

[56] References Cited

U.S. PATENT DOCUMENTS 4,125,276  11/1978  Levasseur ................................ 280/718
5,007,660  4/1991  Orndorf, Jr. et al. .................... 280/715
5,024,462  6/1991  Assh ........................................ 280/712

Primary Examiner—Paul N. Dickson
Assistant Examiner—Lynda Jasmin
Attorney, Agent, or Firm—Richard A. Romanchik

[57] ABSTRACT

A suspension system for a vehicle includes a frame, a wheel support member, a leaf spring secured to the wheel support member, a first connector for first pivotally connecting one end of the leaf spring to the frame, a torsion spring having a central shaft, an outer housing and an elastomer disposed between the central shaft and the housing, and a lever for pivotally interconnecting the central shaft with the other end of the leaf spring. The torsion spring is located between the leaf spring and the frame so that compression of the leaf spring causes the lever to be displaced rotationally toward the vehicle frame.

28 Claims, 6 Drawing Sheets

LEAF SPRING SUSPENSION SYSTEM

TECHNICAL FIELD

The present invention relates to suspension systems and more particularly to a vehicle suspension utilizing a compression torsion spring used in cooperation with a leaf spring suspension.

BACKGROUND OF THE INVENTION

It is conventional to use a leaf spring at each side of a vehicle to provide the suspension mechanism between the frame of the vehicle and the axle, such that one end of each spring is pivotally fixed to the frame and the other end connected via a shackle to the frame. In many instances, such as in pickup trucks as well as large trucks, the suspension system is designed to give acceptable rides where the vehicle is substantially loaded, but provide a poor and uncomfortably stiff ride when the vehicle is very lightly loaded as with only the driver and no cargo. In some instances, this condition exists because the rear springs are designed for rated (full cargo) loads and such springs are far too stiff. In addition to the above, helper springs are also used in conjunction with the lead spring but this generally only aggravates the stiff ride problem.

The above mentioned shackle which connects the leaf spring to the vehicle frame are categorized in two ways, as compression shackles or tension shackles. Commonly owned U.S. Pat. No. 5,007,660 (the disclosure of which being hereby fully incorporated herein by reference) describes a torsion spring member being utilized to replace a tension type shackle. Many vehicles, however, are equipped with compression type shackles and therefore the system described in Orndorff, Jr. et al. is inappropriate. What is needed then is a replacement system for compression shackle leaf spring systems. Efforts to improve such systems have lead to continuing developments to improve versatility, practicality and efficiency.

DISCLOSURE OF THE INVENTION

An object of the present invention is to provide a suspension system for interconnecting a leaf spring of a vehicle to the vehicle frame using a compression shackle member utilizing a torsion spring.

According to the present invention, a suspension system for a vehicle having a frame, a wheel support member, a leaf spring secured to the wheel support member, a first connector for first pivotally connecting one end of the leaf spring to the frame, a torsion spring having a central shaft, an outer housing and an elastomer disposed between the central shaft and the housing, a lever for pivotally interconnecting the central shaft with the other end of the leaf spring, wherein the torsion spring is placed above the leaf spring so that compression of the leaf spring causes the lever to be displaced rotationally toward the vehicle frame.

The present invention provides a suspension system that reduces vertical spring rate and natural frequency, thereby improving vehicle ride comfort. The present invention absorbs high frequency vibration and noise, thereby reducing the amount transmitted to the frame and ultimately the driver. In addition, the present invention is easily retrofittable.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will therefore become apparent from the following detailed description of the invention when considered in conjunction with the drawings.

BEST MODE FOR CARRYING OUT THE INVENTION

Figure 1:
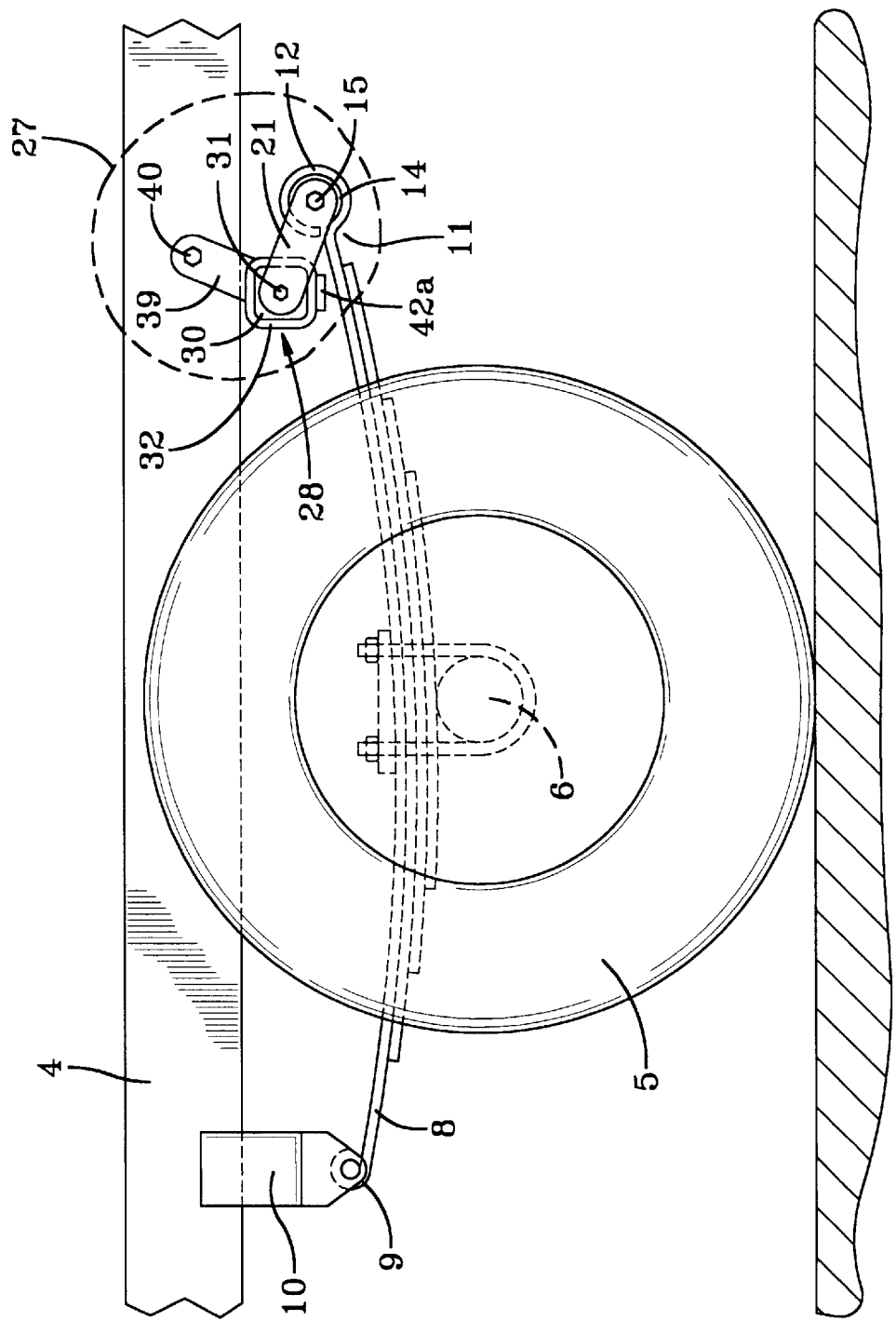
FIG. 1 is a side elevation of a vehicle with the body removed showing a shackle and leaf spring in series wherein the shackle employs a torsion spring in accordance with the present invention.

Referring now to the drawings wherein like reference numerals designate like or corresponding parts throughout different views, there is shown in FIGS. 1, 2A, 2B, and 3 a suspension system which includes a frame 4 (side bars only) of a vehicle with the usual wheel 5 supported by an axle 6.

The vehicles leaf spring 8 has its one end 9 pivotally connected to a bracket 10 which is secured to the frame 4. The other end 11 of the leaf spring 8 is formed into an eye 12 which surrounds an elastomeric sleeve 14. A bolt 15 passes through the sleeve 14 while also passing through bores 17 and 18 of a pair of brackets 20 and 21 respectively. The eye 12, elastomeric sleeve 14 and bolt 15 form the lower part of a compression shackle 27.

Mounted at the shackle 27 upper end and between brackets 20, 21 is a torsion spring assembly 28. The torsion spring assembly includes an elastomeric or rubber member 30 having its inner peripheral surface bonded to an inner or central shaft 31 as by a suitable adhesive. The outer circumferential surface of the elastomeric member 30 is suitably secured to an outer housing 32. Preferably, elastomeric member 30 has a square or other similar keyed shape which facilitates that it may be inserted into a matching housing and thereby be secured without the need for bonding by adhesives. Such matching of elastomer and housing has been determined to support the required torsional loads. Alternatively, the housing 32 may be bonded to the elastomeric member 30.

Outer housing 32 has a pair of upper depending arms or levers 38, 39 that are pivotally connected to the frame 4 via a bolt 40 inserted through openings 35, 36 in the arms and an opening 41 in the frame. Also, an elastomeric stop member or abutment member 42a,b is attached to the lower or bottom surface of outer housing 32.

The eye 12 of leaf spring 8 is pivotally connected to a pivot bolt 15 which bolt 15 supports levers (or arms or brackets) 20 and 21 and thereby becomes an integral part of torsion spring 28 by having the levers 20 and 21 being connected to the shaft 31 of such torsion spring 28. A sleeve or bushing 41 (welded into the frame 4) is utilized to accept 40. Thus the outer housing 32 is also pivotally connected to the frame via the bolt 40 and sleeve 41. It is to be noted that the central shaft 31 of spring 28 is preferably keyed so as to promote easy and effective engagement with the brackets 20 and 21.

Figure 2A:
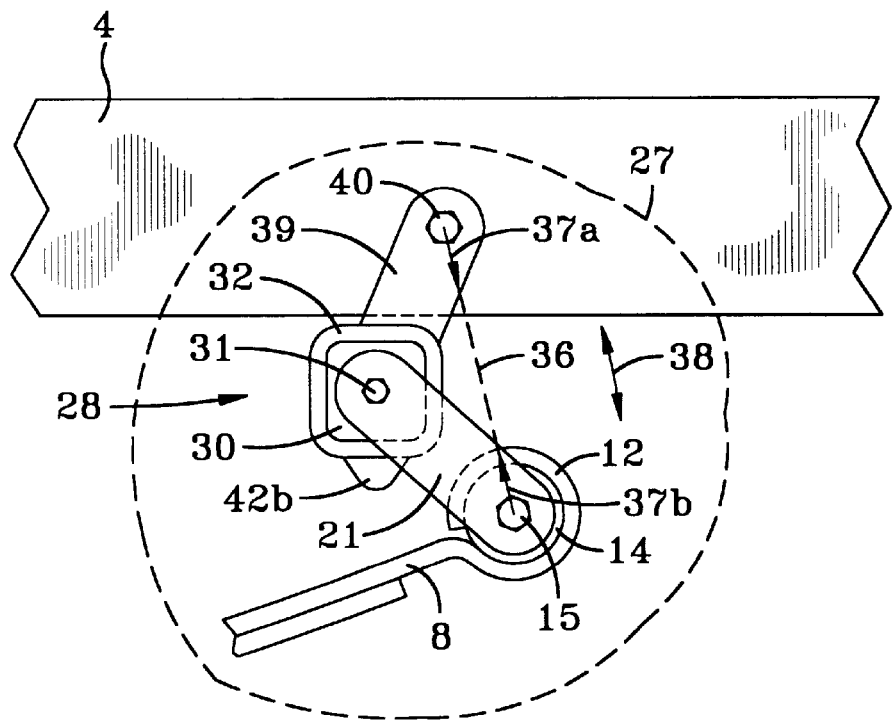
FIG. 2A is an enlarged side elevational view of the link torsion spring with the vehicle in the unloaded state in accordance with the present invention.

In the operation of the shackle and leaf spring, FIGS. 1 and 2A disclose the relationship of the components during an unloaded or very lightly loaded condition. Therein, the spring 8 has its eye 12 connected to the torsion spring 28, with the abutment 42a,b spaced from the leaf spring 8. Under the lightly loaded condition and as the wheel 5 encounters uneven irregularities in the road surface, leaf spring 8 will exert a corresponding force on the torsion spring 28 by having the eye 12 exert a bending force on brackets 20 and 21. The brackets 20 and 21 are rotated with respect to the arm members 38, 39. The elastomeric member 30, which is the actual torsion spring element, is securely fashioned between the shaft 31 and outer shell 32 such as to resist the movement of the shaft and cushion the input forces from the wheel 5 via the leaf spring 8 to the shaft 31. As the load on the leaf spring changes, so does the load on the elastomeric torsion spring 28. The elastomeric torsion spring at its central point allows the suspension system to open and close to accommodate terrain variations, complementing the action of the leaf spring. High frequency noise and vibration transmission are thereby reduced since the only connection between the leaf spring eye and the frame is through the elastomeric torsion spring, which also acts as a vibration isolator.

Figure 2B:
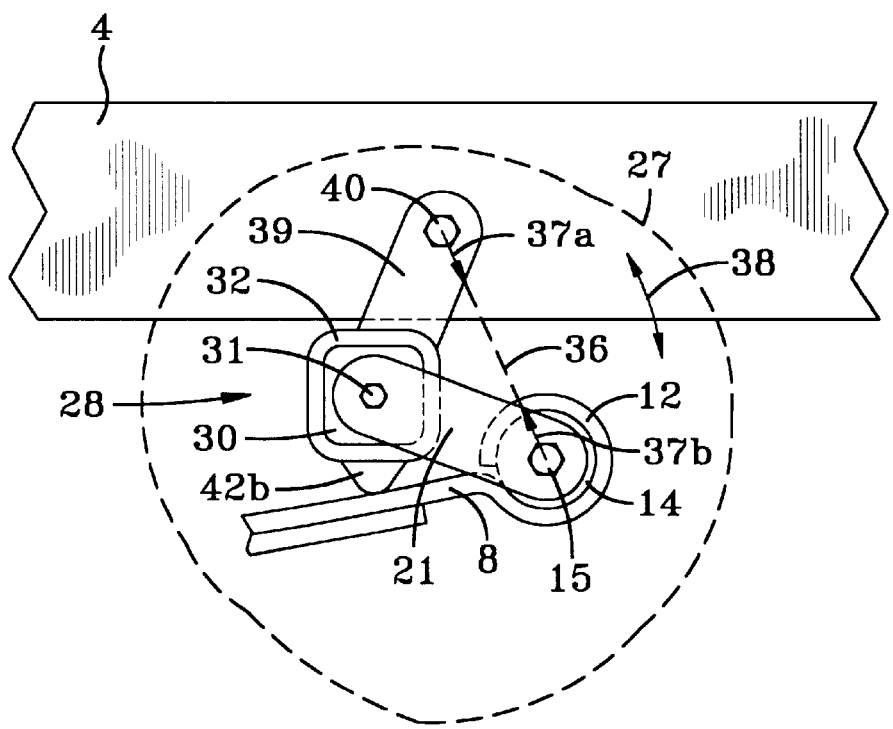
FIG. 2B is an enlarged side elevational view of the link torsion spring in accordance with the present invention with the vehicle in the loaded state.
Figure 3:
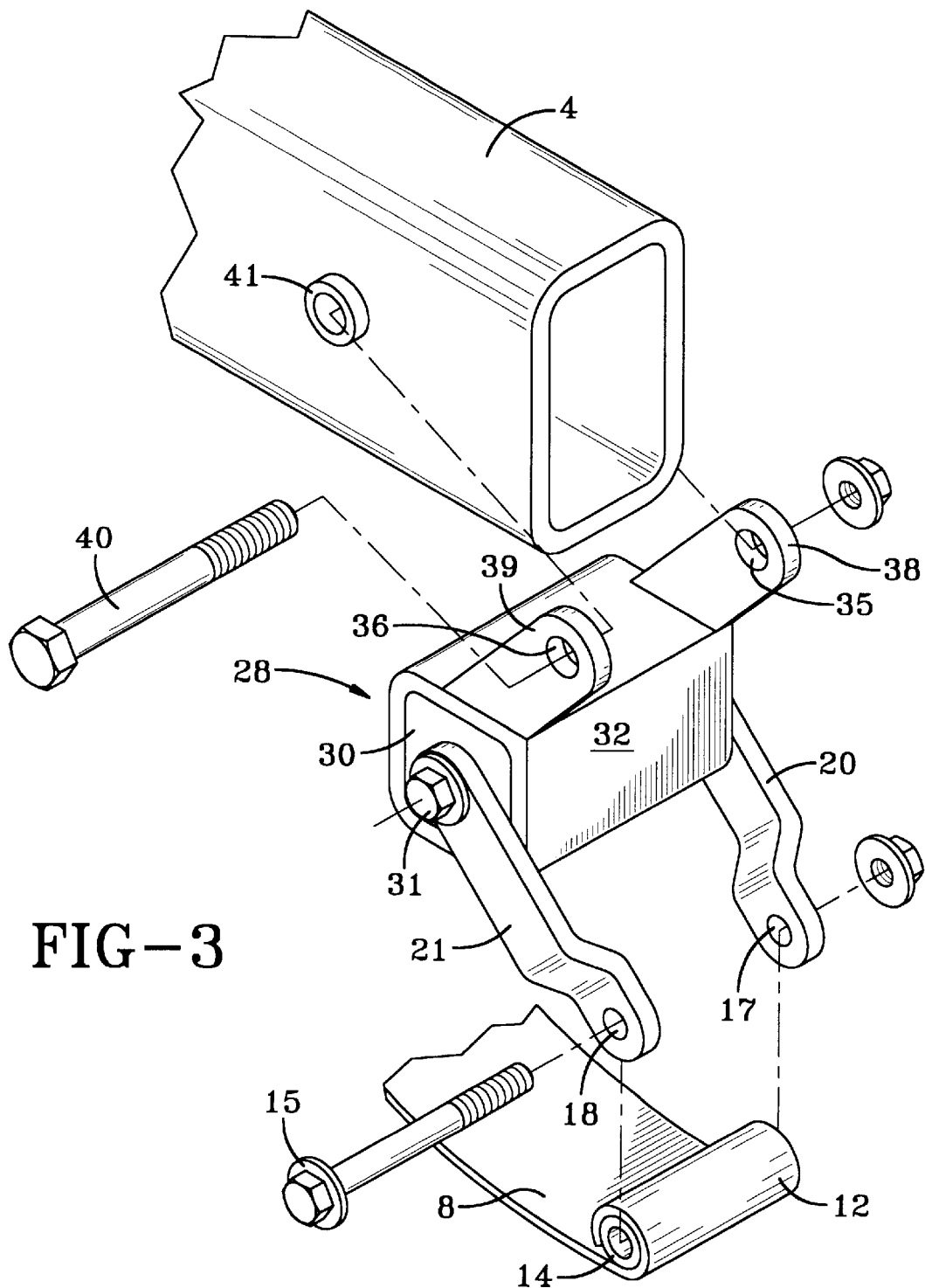
FIG. 3 is an exploded perspective view of a shackle, leaf spring, and vehicle frame in accordance with the present invention.

It can be seen in FIGS. 2A and 2B that the loads between the axle 6 of the vehicle and the frame 4 are carried through bolts 15 and 40 wherein the force moments are along a line 36. Since loads on the frame (due to loading of the vehicle) cause forces on the bolts 15 and 40 to be toward each other as illustrated by arrows 37a, 37b, the shackle 28 is considered a compression shackle, and the torsion spring a compression spring. A compressive force along line 36 causes the arms 39, 21 (and 38, 20) to be rotated towards each other as shown along an arc 38. Since the elastomeric torsion compression spring 28 is located below the frame 4 in this configuration, the lower arms 20, 21 are rotated upwards towards the frame 4.

FIG. 2B discloses the relationship of the components during a loaded condition when the leaf spring is in its fully extended position and in abutment with the abutment member 42b. It can be seen that the suspension system shortens (or closes) as the load is increased. As the vehicle is further loaded to where the respective brackets 20 and 21 rotate the shaft a sufficient distance where the leaf spring 8 encounters the stop member 42b. At this point the torsion spring 28 no longer pivots with changing load, thus limiting the windup of the torsion spring and the drop of the vehicle. The torsion spring 28 is effectively blocked or removed from consideration in responding to road forces on the wheel 5 and thereafter only the leaf spring 8 is effective in reacting to the forces of the suspension system.

Figure 4A:
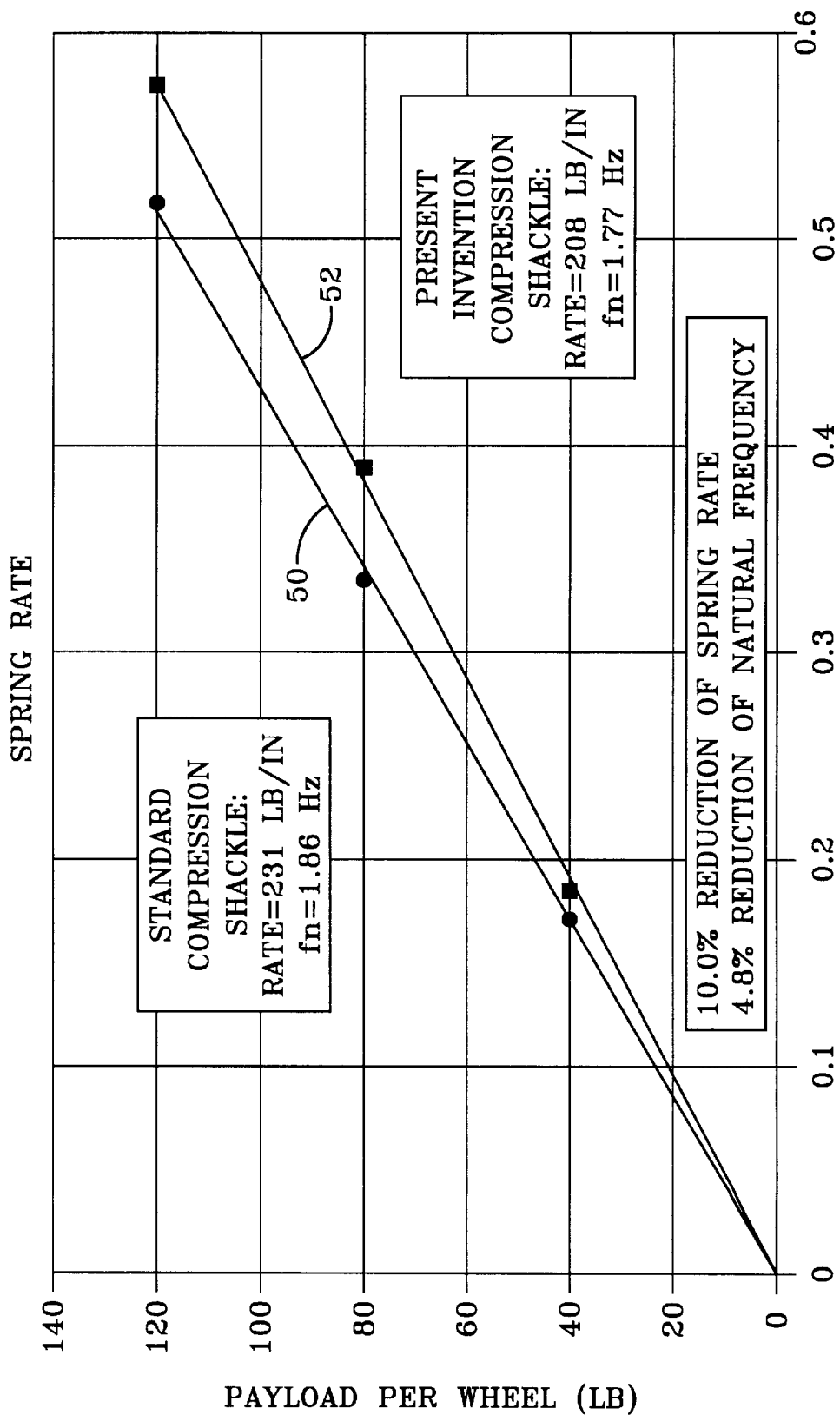
FIG. 4A is a graph showing the deflection curves of a traditional leaf spring suspension system and a replacement suspension system in accordance with the present invention.

Referring now to FIG. 4A wherein a graph displaying wheel load verses spring deflection (spring rate) is shown. A first curve 54 shows the spring rate of a suspension system utilizing a leaf spring and a conventional compression shackle. A curve 56 shows a suspension system in accordance with the present invention comprising the same leaf spring in combination with an elastomeric torsion spring compression shackle. It can be seen that the spring rate of the prior art is approximately 231 lb/in and the natural frequency of such system is approximately 1.86 Hz. The spring rate of a system in accordance with the present invention is equal to approximately 208 lb/in with a natural frequency of approximately 1.76 Hz. It has been found that a lower natural frequency on the order of 1.3 Hz is most desirable from a comfort standpoint. So it is therefore shown that the present invention compression torsion spring suspension system provides an approximate 10.0% reduction in spring rate and an approximate 4.8% reduction in natural frequency from a suspension system utilizing a leaf spring and a conventional compression shackle, thereby improving the riding characteristics of the vehicle.

Figure 4B:
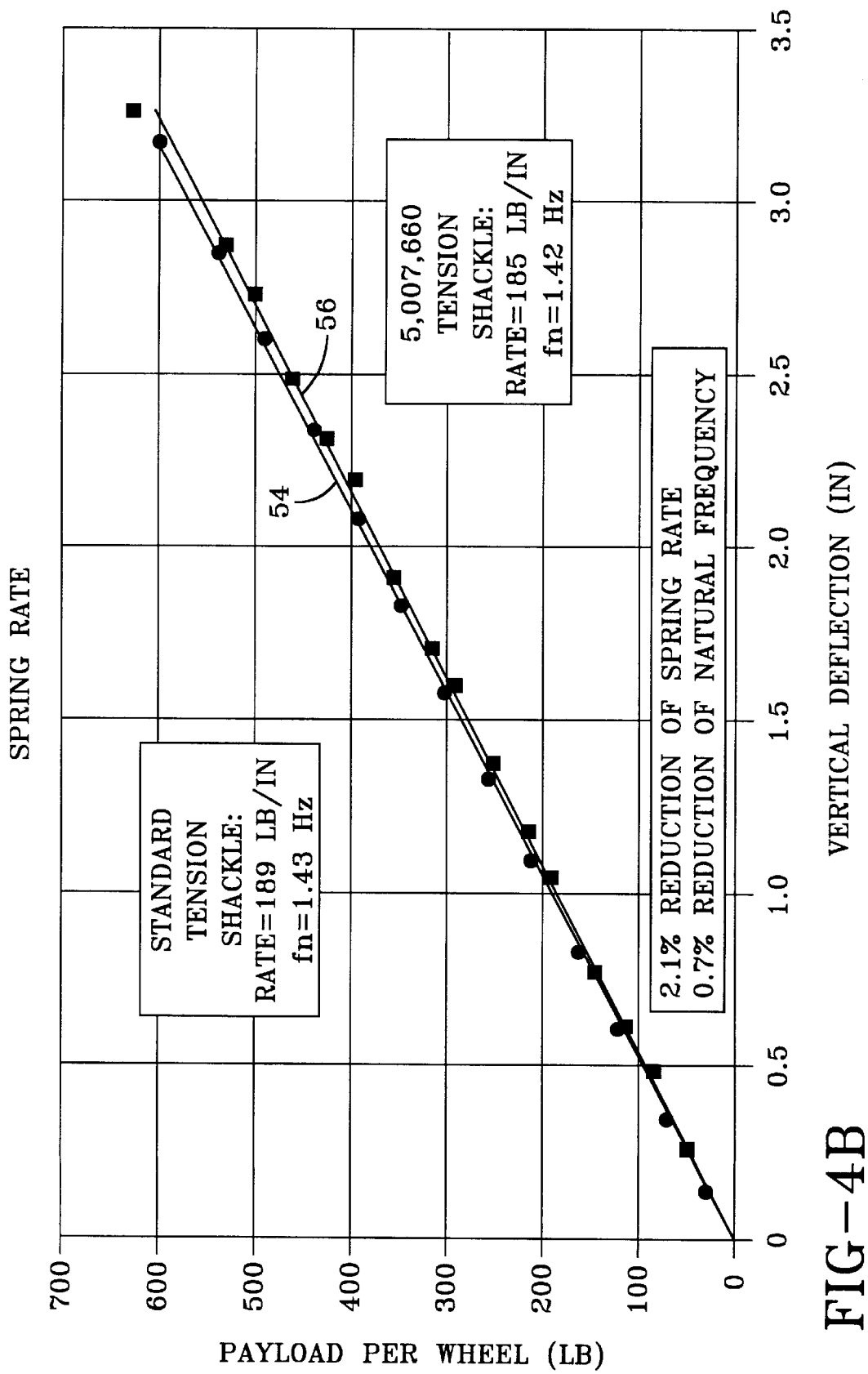
FIG. 4B is a graph showing the deflection curves of a traditional leaf spring suspension system and a replacement suspension system in accordance with the invention described in U.S. Pat. No. 5,007,660.

Referring now to FIG. 4B wherein a graph displaying wheel load verses spring deflection (spring rate) is shown. A first curve 54 shows the spring rate of a suspension system utilizing a leaf spring and a conventional tension shackle. A curve 56 shows a suspension system in accordance with the present invention comprising the same leaf spring in combination with an elastomeric torsion spring tension shackle as described in U.S. Pat. No. 5,007,660. It can be seen that the spring rate of the prior art is approximately 189 lb/in and the natural frequency of such system is approximately 1.43 Hz. The spring rate of a system in accordance with U.S. Pat. No. 5,007,660 is equal to approximately 185 lb/in with a natural frequency of approximately 1.42 Hz. It can therefore be seen that the tension torsion spring suspension system described in U.S. Pat. No. 5,007,660 provides an approximate 2.1% reduction in spring rate and an approximate 0.7% reduction in natural frequency from a suspension system utilizing a leaf spring and a conventional tension shackle.

As illustrated in FIGS. 4A and 4B, a comparison between the present invention compression torsion spring suspension system and the tension torsion spring suspension system described in U.S. Pat. No. 5,007,660 reveals that the present invention unexpectedly provides a spring rate improvement over conventional systems that is approximately five times greater than the spring rate improvement of the system described in U.S. Pat. No. 5,007,660. Additionally, the present invention unexpectedly provides a natural frequency reduction over conventional systems that is approximately seven times greater than the natural frequency reduction of the system described in U.S. Pat. No. 5,007,660.

Figure 5A:
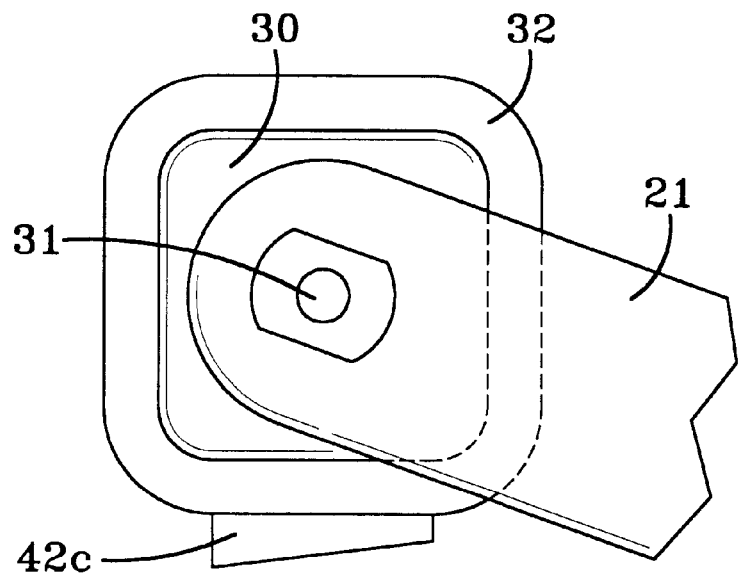
FIG. 5A is an enlarged side elevational view of the link torsion spring in accordance with the present invention with a tapered stop member.
Figure 5B:
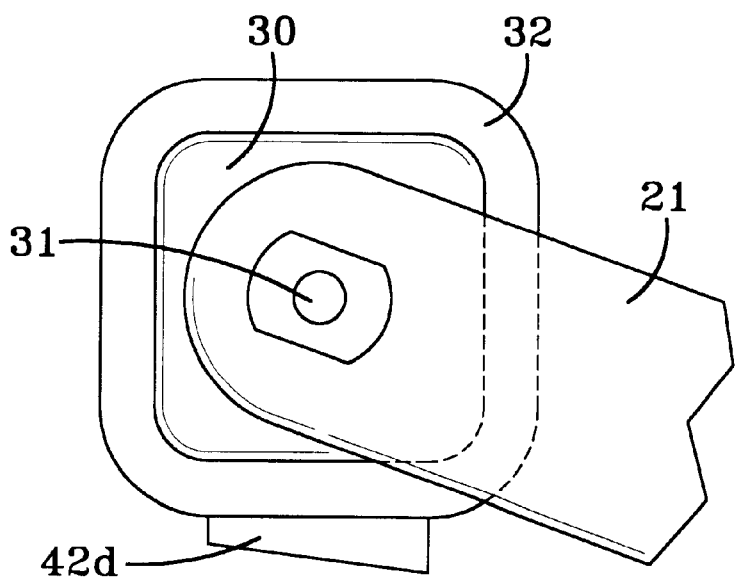
FIG. 5B is an enlarged side elevational view of the link torsion spring in accordance with the another embodiment of the present invention with a tapered stop member.

Referring now to FIGS. 5A and 5B, wherein an elastomeric torsion spring in accordance with the present invention is shown. It can be seen the elastomeric stop members 42c, 42d have a tapered cross section or thickness. This may be preferred in order to make transition to a "bottom out" condition smooth and gradual. It is to be noted that the stop member 42a in FIG. 1 is illustrated as a rectangular shaped member while the stop member 42b in FIGS. 2A, 2B is illustrated as a triangular shaped member. The preferred shape may be one of those shown in FIGS. 1, 2A, 2B, 5A, 5B or another variation not shown, depending on the particular application.

The elastomeric members 30, 42a,b,c,d described herein may be comprised of an elastomer, such as vulcanized rubber or other elastomeric polymer composition having suitable durometer hardness, spring rate, and other properties, all of which are now determinable by one skilled in the art in a given application. An elastomer is defined as a substance that can be stretched at room temperature to at least twice its original length and, after having been stretched and the stress removed, returns with force to approximately its original length in a short time. (See Glossary of Terms as prepared by ASTM Committee D-11 on Rubber and Rubber-like Materials, published by the American Society of Testing Materials). The elastomeric or rubber material that can be used in constructing the present invention includes any of the well known elastomers, such as natural rubber, copolymers of butadiene and acrylonitrile, copolymers of butadiene and styrene, copolymers of butadiene and alkyl acrylates, butyl rubber, olefin rubbers such as ethylene-propylene and EPDM rubber, fluorocarbon rubbers, fluorosilicone rubbers, silicone rubber, chlorosulfonated polyethylene, polyacrylates, polybutadiene, polychloroprene and the like.

Although the invention has been shown and described with exemplary embodiments thereof, it should be understood by those skilled in the art that the foregoing and various other changes, omissions and additions may be made therein and thereto without departing from the spirit and the scope of the invention.

What is claimed is:

1. A suspension system for a vehicle having a frame, a wheel and an axle to support the wheel, the suspension system comprising:
    a leaf spring for securing to the axle;
    a connector for connecting one end of the leaf spring to the frame;
    a torsion spring comprising a central shaft, an outer housing and an elastomer disposed between the central shaft and the housing;
    a first lever for pivotally interconnecting the central shaft with the other end of the leaf spring; and,
    a second lever for pivotally interconnecting the outer housing to the frame;
    wherein the first and second levers are positioned such that compression of the leaf spring causes the levers to be displaced toward each other and such displacement is resisted by the torsion spring.

2. A system in accordance with claim 1, further comprising an elastomeric stop member attached to the housing for engagement with the leaf spring when the leaf spring is loaded to a predetermined level.

3. A system in accordance with claim 1, wherein the housing is square in shape.

4. A system in accordance with claim 1, wherein the stop mechanism has a tapered cross section.

5. A suspension system for a vehicle having a frame, a wheel and an axle to support the wheel, the suspension system comprising:
    a leaf spring for securing to the axle;
    a connector for connecting one end of the leaf spring to the frame;
    a torsion spring comprising a central shaft, an outer housing connected to the frame, and an elastomer disposed between the central shaft and the housing; and,
    a lever for pivotally interconnecting the central shaft with the other end of the leaf spring,
    wherein the torsion spring is positioned such that compression of the leaf spring causes the lever to be displaced toward the frame and such displacement is resisted by the torsion spring.

6. A system in accordance with claim 5, further comprising elastomeric stop member attached to the housing for engagement with the leaf spring when the leaf spring is loaded to a predetermined level.

7. A system in accordance with claim 5, wherein the housing is square in shape.

8. A system in accordance with claim 5, wherein the stop mechanism has a tapered cross section.

9. A suspension system for a vehicle having a frame, a wheel and an axle to support the wheel, the suspension system comprising:
    a leaf spring for securing to the axle;
    a connector for connecting one end of the leaf spring to the frame;
    a torsion spring comprising a central shaft, an outer housing and an elastomer disposed between the central shaft and the housing;
    a first lever for pivotally interconnecting the central shaft with the other end of the leaf spring; and,
    a second lever for pivotally interconnecting the outer housing to the frame;
    wherein the first and second levers are positioned such that compression of the leaf spring causes the levers to be compressed toward each other and such compression is resisted by the torsion spring.

10. A system in accordance with claim 9, further comprising an elastomeric stop member attached to the housing for engagement with the leaf spring when the leaf spring is loaded to a predetermined level.

11. A system in accordance with claim 9, wherein the housing is square in shape.

12. A system in accordance with claim 9, wherein the stop mechanism has a tapered cross section.

13. A suspension system for a vehicle having a frame, a wheel and an axle to support the wheel, the suspension system comprising:
    a leaf spring for securing to the axle;
    a connector for connecting one end of the leaf spring to the frame;
    a torsion spring comprising a central shaft, an outer housing and an elastomer disposed between the central shaft and the housing;
    a first lever for pivotally interconnecting the central shaft with the other end of the leaf spring; and,
    a second lever for pivotally interconnecting the outer housing to the frame;
    wherein the first and second levers are positioned such that loading of the vehicle causes the levers to be displaced rotationally toward each other and such displacement is resisted by the torsion spring.

14. A system in accordance with claim 13, further comprising an elastomeric stop member attached to the housing for engagement with the leaf spring when the vehicle is loaded to a predetermined level.

15. A system in accordance with claim 13, wherein the housing is square in shape.

16. A system in accordance with claim 13, wherein the stop mechanism has a tapered cross section.

17. A suspension system for a vehicle having a frame, a wheel and an axle to support the wheel, the suspension system comprising:
    a leaf spring for securing to the axle;
    a connector for connecting one end of the leaf spring to the frame;
    a torsion spring comprising a central shaft, an outer housing connected to the frame, and an elastomer disposed between the central shaft and the housing; and, a lever for pivotally interconnecting the central shaft with the other end of the leaf spring, wherein the torsion spring is positioned such that loading of the vehicle causes the lever to be rotated toward the frame and such rotation is resisted by the torsion spring.

18. A system in accordance with claim 17, further comprising elastomeric stop member attached to the housing for engagement with the leaf spring when the vehicle is loaded to a predetermined level.

19. A system in accordance with claim 17, wherein the housing is square in shape.

20. A system in accordance with claim 17, wherein the stop mechanism has a tapered cross section.

21. A suspension system for a vehicle having a frame, a wheel and an axle to support the wheel, the suspension system comprising:

a leaf spring for securing to the axle;

a connector for connecting one end of the leaf spring to the frame;

a torsion spring comprising a central shaft, an outer housing and an elastomer disposed between the central shaft and the housing;

a first lever for pivotally interconnecting the central shaft with the other end of the leaf spring; and, a second lever for pivotally interconnecting the outer housing to the frame;

wherein the first and second levers are positioned such that loading of the vehicle causes the levers to be rotationally compressed toward each other and such compression is resisted by the torsion spring.

22. A system in accordance with claim 21, further comprising an elastomeric stop member attached to the housing for engagement with the leaf spring when the vehicle spring is loaded to a predetermined level.

23. A system in accordance with claim 21, wherein the housing is square in shape.

24. A system in accordance with claim 21, wherein the stop mechanism has a tapered cross section.

25. A suspension system for a vehicle having a frame, a wheel and an axle to support the wheel, the suspension system comprising:

a leaf spring means for securing to the axle;

a connector for connecting one end of the leaf spring means to the frame;

a torsion spring means comprising a central shaft, an outer housing and an elastomer disposed between the central shaft and the housing;

a first lever means for pivotally interconnecting the central shaft with the other end of the leaf spring means; and, a second lever means for pivotally interconnecting the outer housing to the frame;

wherein the first and second lever means are positioned such that loading of the vehicle causes the lever means to be displaced rotationally toward each other and such displacement is resisted by the torsion spring.

26. A system in accordance with claim 25, further comprising an elastomeric stop member attached to the housing for engagement with the leaf spring means when the vehicle is loaded to a predetermined level.

27. A system in accordance with claim 25, wherein the housing is square in shape.

28. A system in accordance with claim 25, wherein the stop mechanism has a tapered cross section.

* * * * *